United States Patent
Childress et al.

(10) Patent No.: US 10,038,971 B2
(45) Date of Patent: Jul. 31, 2018

(54) SECURE MOBILE DEVICE RECOVERY

(71) Applicant: INTERNATIONAL BUSINESS MACHINES CORPORATION, Armonk, NY (US)

(72) Inventors: Rhonda L. Childress, Austin, TX (US); Itzhack Goldberg, Hadera (IL); Clifford A. Pickover, Yorktown Heights, NY (US); Neil Sondhi, Budapest (HU); Maja Vukovic, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/666,997

(22) Filed: Mar. 24, 2015

(65) Prior Publication Data
US 2016/0286035 A1  Sep. 29, 2016

(51) Int. Cl.
*H04M 3/42* (2006.01)
*H04W 4/021* (2018.01)
*H04M 1/725* (2006.01)

(52) U.S. Cl.
CPC ....... *H04W 4/021* (2013.01); *H04M 1/72597* (2013.01); *H04M 1/7258* (2013.01); *H04M 1/72583* (2013.01)

(58) Field of Classification Search
CPC ........... H04M 1/72586; H04M 1/7258; H04M 1/72597; H04W 4/021
USPC ................................................... 455/414.1
See application file for complete search history.

(56) References Cited

U.S. PATENT DOCUMENTS

| | | | |
|---|---|---|---|
| 7,978,068 B1 | 7/2011 | Caplan et al. | |
| 8,467,768 B2 | 6/2013 | Mahaffey et al. | |
| 8,855,601 B2 | 10/2014 | Grkov et al. | |
| 2006/0161628 A1 | 7/2006 | Nagy et al. | |
| 2007/0064636 A9* | 3/2007 | Koch ................ | H04W 28/14 370/310.2 |
| 2007/0077924 A1 | 4/2007 | Bhogal et al. | |
| 2007/0117538 A1* | 5/2007 | Weiser ............... | G06Q 20/102 455/406 |
| 2007/0224980 A1* | 9/2007 | Wakefield ......... | G08B 13/1427 455/418 |

(Continued)

FOREIGN PATENT DOCUMENTS

| | | |
|---|---|---|
| CN | 203120003 | 8/2013 |
| WO | 2002084615 | 10/2002 |

OTHER PUBLICATIONS

Alienman Technologies, "Where's My Droid"., http://wheresmydroid.com, Sep. 25, 2014, 6 pages.

(Continued)

*Primary Examiner* — Shahriar Behnamian
(74) *Attorney, Agent, or Firm* — William M Hartwell; Andrew M. Colderon; Roberts Mlotkowski Safran Cole & Calderon P.C.

(57) ABSTRACT

An approach includes contacting a predefined contact information when a mobile device, which is password protected, is lost and subsequently found. The approach includes receiving an activation event predefined for a specified password protected mobile device, and receiving predefined contact information stored in the mobile device while the mobile device remains password protected, upon the receipt of the activation event.

20 Claims, 7 Drawing Sheets

(56) References Cited

U.S. PATENT DOCUMENTS

| | | | |
|---|---|---|---|
| 2008/0064387 A1* | 3/2008 | Koncelik | H04W 8/245 |
| | | | 455/425 |
| 2009/0151005 A1* | 6/2009 | Bell | H04L 63/1416 |
| | | | 726/28 |
| 2009/0253410 A1 | 10/2009 | Fitzgerald et al. | |
| 2012/0242686 A1 | 9/2012 | Umealu | |
| 2013/0283212 A1 | 10/2013 | Zhu et al. | |
| 2013/0326642 A1 | 12/2013 | Hajj et al. | |
| 2014/0085460 A1* | 3/2014 | Park | G06F 21/84 |
| | | | 348/135 |
| 2014/0148120 A1* | 5/2014 | Buck | H04W 4/22 |
| | | | 455/404.2 |
| 2014/0336989 A1* | 11/2014 | Ye | G01C 22/006 |
| | | | 702/189 |
| 2016/0142532 A1* | 5/2016 | Bostick | H04M 1/72577 |
| | | | 455/411 |

OTHER PUBLICATIONS

Alienman Technologies LLC., https://play.google.com/store/apps/details?id=com.alienmanfc6.wheresmyandroid, Aug. 26, 2014.

Rick Broida., "Recover a Missing Android Phone with Where's My Droid"., Oct. 5, 2011, 3 pages.

Rick Broida., "How to improve your chances of recovering a lost Android phone"., Feb. 20, 2013, 3 pages.

Unknown "Lookout Security & Antivirus", Lookout Mobile Security—Oct. 11, 2014, 4 pages.

\* cited by examiner

SECURE MOBILE DEVICE RECOVERY

TECHNICAL FIELD OF THE INVENTION

The present invention generally relates to a method for secure mobile device recovery and, more particularly, a method and system for specifying one or more call numbers or other modes of communication to send a message to a lost or misplaced device.

BACKGROUND

Mobile devices (e.g., a cell phone) are easily misplaced and/or lost. Even when a person other than the owner finds the misplaced and/or lost mobile device, it may still be difficult to find the owner. In the early days of cell phones, for example, the person who found the device could simply open up the cell phone, access the phone contacts, and call a contact, e.g., spouse, relative, or friend, of the owner to advise the owner that the person has found the mobile device.

However, with the advent of "smart" and other advanced mobile devices, most owners use passwords (e.g., passcode locks) to protect their data. This makes it more difficult for the person who finds the misplaced and/or lost cell phone or other mobile device to identify and/or find the owner. Thus, the person who finds the misplaced and/or lost cell phone or other mobile device must wait for the owner to first realize the cell phone or other mobile device has been misplaced and/or lost and then try to call back or send a message to the cell phone or other mobile device in order to retrieve the misplaced and/or lost cell phone.

SUMMARY

In a first aspect of the invention, a method is implemented in a computer infrastructure having computer executable code tangibly embodied on a computer readable storage medium having programming instructions configured to: receive an activation event predefined for a specified password protected mobile device; and receive predefined contact information stored in the mobile device while the mobile device remains password protected, upon the receipt of the activation event.

In another aspect of the invention, there is a computer program product that includes a computer readable storage medium having program code embodied in the storage medium. The program code is not a transitory signal per se, and the program instructions are readable by a computing device to cause the computing device to perform a method that includes receiving an activation event for a mobile device which is password protected. The computer program product further includes: receiving an activation event for a mobile device which is password protected; analyzing logs of contact information stored in the mobile device; determining contact information from the analyzed logs; and contacting a device using the determined contact information in response to the activation event, while the mobile device remains password protected.

In a further aspect of the invention, a system is provided that includes a CPU, a computer readable memory and a computer readable storage medium. Additionally, the system includes one or more program instructions. The system includes program instructions residing on a mobile device to determine that the mobile device is lost. The system further includes program instructions to: determine a current location of the mobile device; determine that the mobile device is misplaced; and automatically contact a device using predefined contact information stored in the mobile device in response to the mobile device being misplaced. The program instructions are stored on the computer readable storage medium for execution by the CPU via the computer readable memory.

In another aspect of the invention, a method is provided for deploying a system for retrieving lost or misplaced password protected mobile devices using an activation event in a computing environment. The method comprises providing a computer infrastructure being operable to perform any combination of the method steps and/or any combination of functionality of the computing environment disclosed and/or recited herein.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

Figure 1:
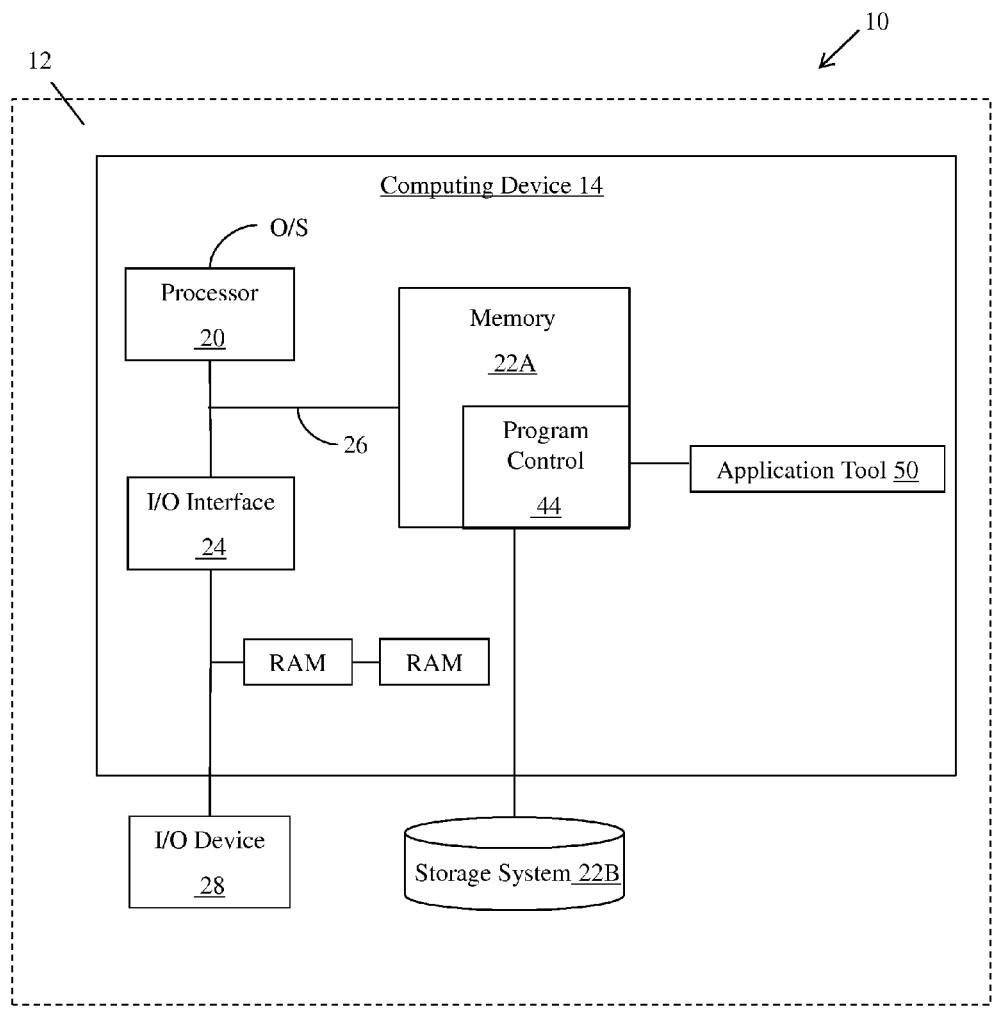
FIG. 1 shows an illustrative environment for implementing the steps in accordance with aspects of the invention.

The present invention generally relates to a method for secure mobile device recovery and, more particularly, a method and system for specifying one or more call numbers or other modes of communication to send a message to a lost or misplaced device. In more specific embodiments, the methods and systems specify one or more call numbers or other modes of communication to send a message to the device when it is lost and subsequently found by another person. More specifically, the systems and methods described herein provide an application for a mobile device (e.g., a cell phone, a tablet, a smart phone, a phablet, GPS device, smart watch, etc.) with an activation event to contact the owner or other designated person using contact information (e.g., a call) or other message type (e.g., SMS message, email, etc.) to a specified communication device even when the lost mobile device is password protected.

Currently, when a mobile device is lost and is password protected (e.g., passcode lock), a person who finds the mobile device will have a difficult time returning the mobile device to the owner. However, in embodiments, even if the mobile device is lost and is password protected, the application of the mobile device provides an activation event to contact the owner or other specified device using predefined contact information (e.g., a call to a predefined call number) or other communication type (e.g., SMS message, email, etc.) even if the lost mobile device is password protected. Thus, in the embodiments, the person who finds the mobile device is able to contact the owner (e.g., call a specified call number) even if the mobile device is password protected. Thus, the chances to return the mobile device to its original the owner are increased. Hereinafter, the term "call" and/or "call number" and variations thereof should be understood to be not only a telephone number, but any communication type such as, e.g., email, text message, etc., which can be provided from the lost mobile device to another communication device.

The application of the mobile device may be embedded in the operating system, such that the activation event is a standardized activation event, which can occur when the mobile device is locked and waiting for the person to input the password (e.g., passcode) to the mobile device. Alternatively, the application may be created by a developer so that the owner of the device can modify the application to change the activation event and predefined contact information (e.g., specified call number).

In order for the person who finds the mobile device to contact the owner or other contact information (e.g., call the specified call number), the application may provide for different activation events, e.g., different ways to activate the call. The application may activate or initiate the call using one trigger, multiple triggers, or a combination of triggers. For example, the activation event to activate or initiate the call may include using at least one of a special key, a combination of keys, a special gesture input through a touch screen of the mobile device, a special sound input to a microphone of the mobile device, a visual activation, or a motion of the mobile device. The specific activation event may be set by a user, set by at least one phone manufacturer, a mobile device service provider, operating system programmers, application developers, etc. One of the many advantages to having the activation event set by at least one phone manufacturer, a mobile device service provider, or operating system programmer is that the activation event may be a worldwide standard.

The special key or a combination of keys may be physical keys on the mobile device or input through the touch screen of the mobile device. The special sound may be the person speaking the words "phone lost" or "call lost". However, the systems and method described herein contemplates the use of any special sound including a set of predefined words that can be used to activate or initiate the call. The visual activation event may be a photo of the person who found the mobile device. The motion of the mobile device may comprise shaking of the phone in a particular manner. For example, the motion of the mobile device may be a predefined standard, such as shaking vertically or horizontally for a predetermined amount of time, e.g., few seconds. This will prevent the motion of the mobile device from being unintentionally activated during normal use. Any of these activation events can eventually be used to provide a reward to the person finding the lost mobile device.

The activation event can also be activated or deactivated by the owner. For example, the owner of the mobile device may activate or deactivate the activation event based on their preferences. Further, an authorized third party (e.g., police officer, etc.) can activate or deactivate the activation mechanism, e.g., activation event.

The contact information (e.g., specified call number) may be the owner of the mobile device, a third party, a company, or any other specified person or entity, etc. Further, the contact information may be a group of call numbers that are contacted (i.e., a group call). For example, if the mobile device is lost, the mobile device can be activated or initiated to contact (e.g., call) a relative of the owner of the mobile device. Alternatively, the mobile device can be activated or initiated to contact (e.g., call) the owner of the device.

In embodiments, the application of the mobile device may set a predefined contact information (e.g., the specified call number), automatically. For example, the application may learn the specified call number through analysis of the mobile device (e.g., phone) usage. Illustratively, if the application examines the logs (e.g., phone call logs) of the mobile device, and determines that a contact (e.g., phone call) is a particular person which is frequently contacted (such as a parent of the mobile device the owner), the device of the frequently contacted (e.g., called) person can be set as the specified call number. Alternatively, the application can examine the logs and set contact information (e.g., call number) designated as "home" as the predefined contact information (e.g., specified call number). Home is used as an example, but embodiments are not limited to such call number. For example, the number designated as "mom", "dad", "best friend", etc., may be used by the application as the specified call number.

In further embodiments, the application may learn common contexts in which the mobile device is lost and/or misplaced. For example, the application can use the mobile device's location services (e.g., global positioning system) and determine that the mobile device is in a location that is far away (i.e., a predetermined distance) from locations where the owner generally uses the device. In this example, an automated contact (e.g., call) may be made by the application to the predefined contact information (e.g., specified call number) after a certain predefined time period. Alternatively, if the application determines that the mobile device has not been used in a certain timeframe (i.e., a predetermined time), such as five days, an automated contact (e.g., call) may be made by the application to the predefined contact information (e.g., specified call number). In other embodiments, the automated contact may further include a text message of the current location of the mobile device to the predefined contact information (e.g., specified call number).

In still further embodiments, the application may be used to remotely turn on the ringer function when the ringer is off. For example, if the owner of a mobile device misplaces or loses the mobile device when the ringer function is turned off (e.g., in silent mode), the owner may contact (e.g., call) the mobile device and speak or text a code word in order to turn the ringer function of the mobile device on. As an additional feature, the code word may not work unless voice identification and authentication is performed. In other words, the application on the mobile device may require the code word to be spoken by a designated person (e.g., the owner of the mobile device) before turning on the ringer. This provides additional security when remotely turning on the ringing function.

In further embodiments, multiple words may be spoken to indicate ring volume. For example, if a person uses three code words, the first code word could be used to turn on the ringer and the second and third code words could be used to increase the ring volume bar two times, as an example. However, the embodiments contemplated herein are not limited, and various combinations can be used to turn on the ringer and increase the ring volume. In one embodiment, the first code word could be used to turn on the ringer, the second code word can be used to ring at a low ring volume, and the third code word can be used to ring at a volume higher than the low ring volume after the ring occurs at the low ring volume.

Although the systems and methods described hereafter with regard to exemplary methods, and/or computer program products, it should be understood that other implementations are also contemplated by the present invention as described herein. For example, other devices, systems, appliances, and/or computer program products according to embodiments of the invention will be or become apparent to one of ordinary skill in the art upon review of the following drawings and detailed description. It is intended that all such additional other devices, systems, appliances, processes, and/or computer program products be included within this description and within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows an illustrative environment 10 for managing the processes in accordance with the invention. To this extent, environment 10 includes a server 12 or other computing system that can perform the processes described herein. In particular, server 12 includes a computing device 14. The computing device 14 can be resident on a network infrastructure or computing device of a third party service provider (any of which is generally represented in FIG. 1).

The computing device 14 also includes a processor 20 (e.g., CPU), memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with external I/O device/resource 28 and storage system 22B. For example, I/O device 28 can comprise any device that enables an individual to interact with computing device 14 (e.g., user interface) or any device that enables computing device 14 to communicate with one or more other computing devices using any type of communications link. The external I/O device/resource 28 may be for example, a handheld device, PDA, handset, keyboard etc.

In general, processor 20 executes computer program code (e.g., program control 44), which can be stored in memory 22A and/or storage system 22B. Moreover, in accordance with aspects of the invention, program control 44 controls an application tool 50, which performs the processes described herein. The application tool 50 can be implemented as one or more program code in program control 44 stored in memory 22A as separate or combined modules. Additionally, the application tool 50 may be implemented as separate dedicated processors or a single or several processors to provide the function of these tools. While executing the computer program code, the processor 20 can read and/or write data to/from memory 22A, storage system 22B, and/or I/O interface 24. The program code executes the processes of the invention. The bus 26 provides a communications link between each of the components in computing device 14.

By way of example, the application tool 50 may be configured to a call a specified call number upon an activation event, when the mobile device is password protected. The application tool 50 may be loaded in an operating system of the mobile device or may be developed by a developer so that the owner of the mobile device can easily modify the application, e.g., change activation functions, call numbers, etc. Therefore, when a person finds a misplaced/lost mobile device and the application tool 50 determines that an activation event has occurred, the application tool 50 can initiate a call to a specified call number. Activating the specified call number through the application tool 50 can be accomplished using several different activation events, such as at least one of: a special key, a combination of keys, a special gesture input through a touch screen of the mobile device, a special sound input to a microphone of the mobile device, a visual activation, or a motion of the mobile device. Further, the activation event can be set by a user through the application tool 50, set by at least one phone manufacturer, a mobile device service provider, operating system programmers, application developers, etc.

The computing device 14 can comprise any general purpose computing article of manufacture capable of executing computer program code installed thereon (e.g., a personal computer, server, etc.). However, it is understood that computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, server 12 is only illustrative of various types of computer infrastructures for implementing the invention. For example, in embodiments, server 12 comprises two or more computing devices (e.g., a server cluster) that communicate over any type of communications link, such as a network, a shared memory, or the like, to perform the process described herein. Further, while performing the processes described herein, one or more computing devices on server 12 can communicate with one or more other computing devices external to server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Figure 2:
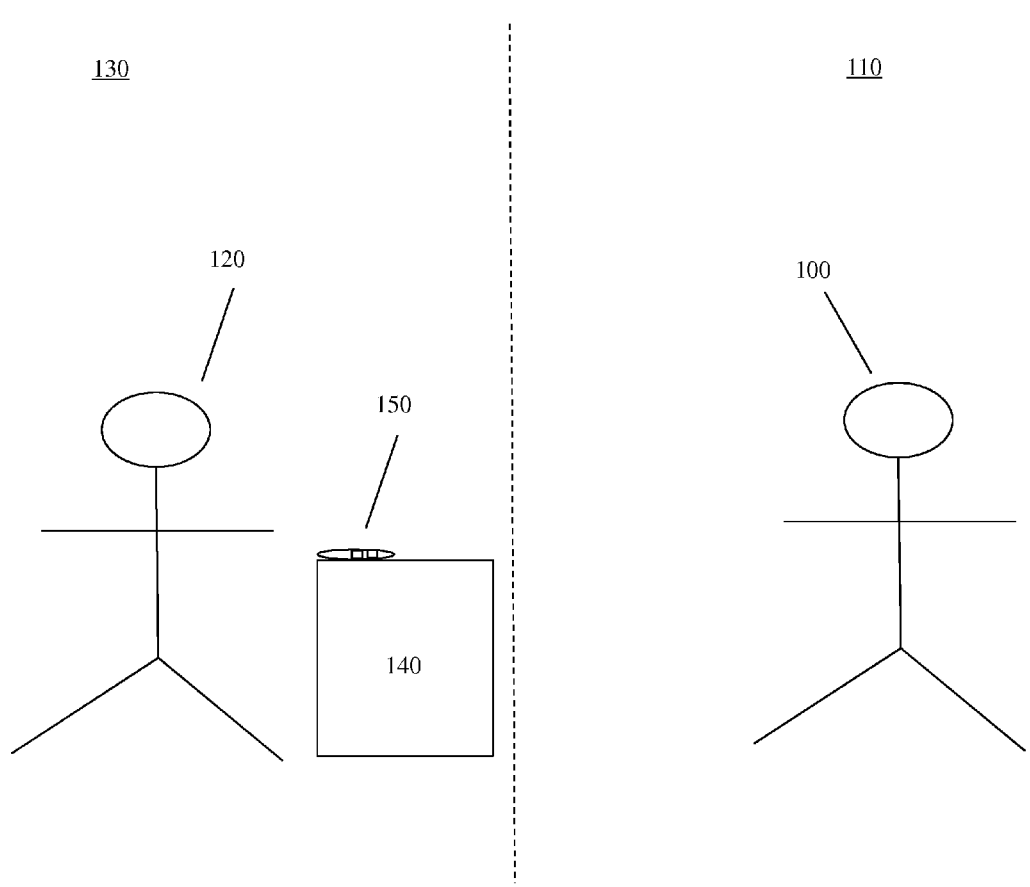
FIG. 2 shows a high level architecture for implementing processes in accordance with aspects of the invention.

FIG. 2 is a high level schematic example implementing processes in accordance with aspects of the present invention. More specifically, FIG. 2 depicts the owner 100 in a first area 110, and a finder 120 of the mobile device 150 in a second area 130. In this example, the mobile device was found on a table 140. In embodiments, mobile device 150 may be any mobile computing device, including a cell phone, a tablet, a smart phone, a phablet, GPS device, smart watch, etc., with an application that activates or initiates a call to a specified call number even when the mobile device is password protected.

In FIG. 2, a finder 120 located in the second area 130 notices mobile device 150 on table 140. After picking up mobile device 150, the finder 120 realizes that he/she is not able to access any contact information since the mobile device 150 is password protected (e.g., passcode is required to access the phone contacts). In embodiments, the application on mobile device 150 may allow the finder 120 to contact (either directly or indirectly) the owner 100 so that the owner 100 can recover the mobile device 150. For example, the finder 120 may activate or initiate a call to a specified call number by any of the activation events described herein (e.g., by use of application tool 50). Upon the activation event, the specified call number may be sent to the owner 100 of mobile device 150, a third party, a company, a relative of the owner, etc., through application tool 50. After finder 120 contacts a person corresponding to the specified call number, the owner 100 can retrieve the mobile device 150.

Figure 3:
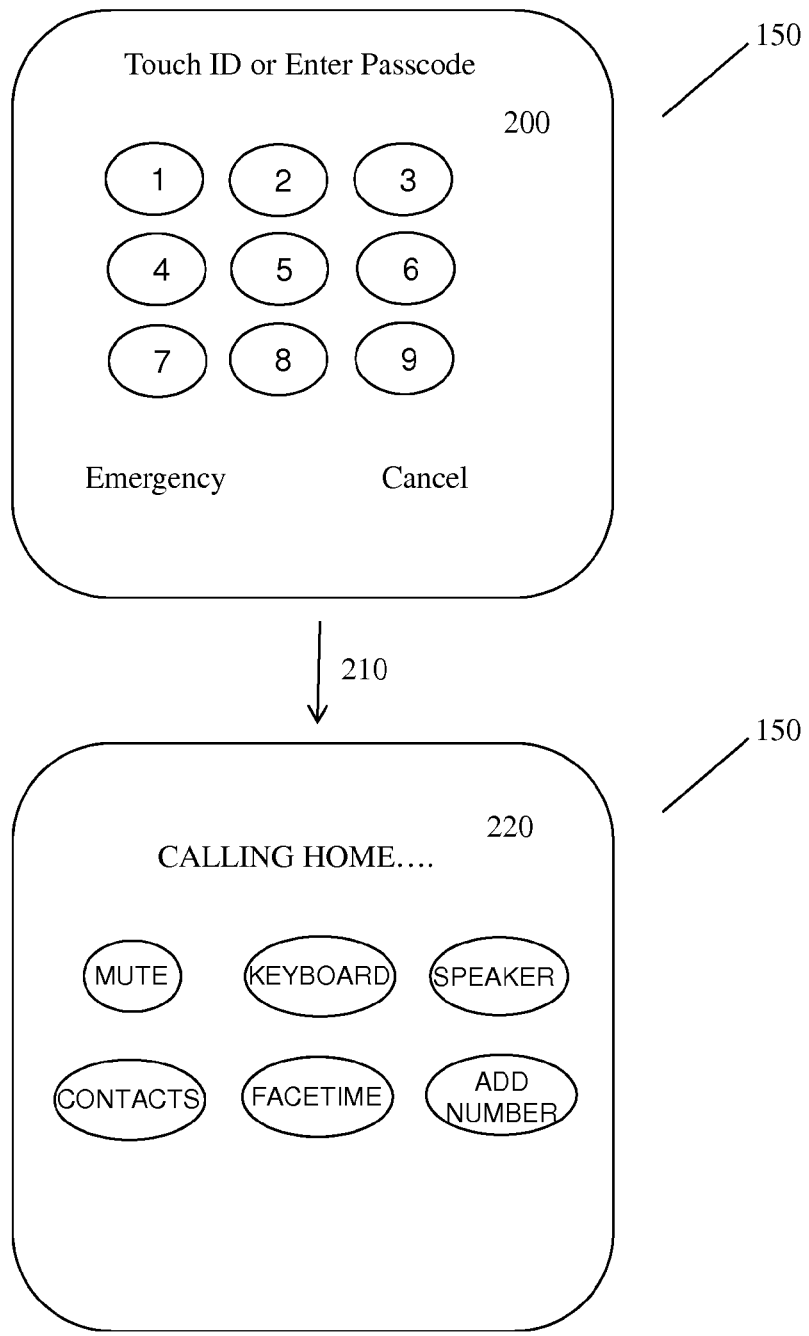
FIG. 3 shows a mobile device screen for implementing processes in accordance with aspects of the invention.

FIG. 3 is a mobile device screen for implementing processes in accordance with aspects of the invention. Although FIG. 3 shows one example of a mobile device screen for mobile device 150, one of ordinary skill in the art would understand that various mobile device screens and interfaces may be used for mobile device 150. For example, a different mobile device screen may be shown for different operating systems.

In FIG. 3, the mobile device 150 may include a first screen 200, e.g., home screen for entering password information. In this example, the first screen 200 is displayed on the mobile device 150 when the finder 120 picks up mobile device 150, which allows the finder 120 to perform one option of entering the password (e.g., passcode through virtual keys or touch identification), making an emergency call, or hitting cancel. Further, the finder 120 may perform an activation event 210 (e.g., preprogrammed event such as a motion of the device, a special word, etc.) in order for the phone to dial a specified call number or otherwise contact (either directly or indirectly) the owner of the mobile device 150 as shown in second screen 220. In embodiments, the first screen can prompt the finder 120 to perform the activation event 210. In a situation of using an emergency call, the emergency call will only dial one predetermined number (e.g., 911). Therefore, the owner and/or finder may prefer the finder 120 using the activation event 210 to contact the owner or other designated contact, as opposed to an emergency call, to allow the owner to retrieve the mobile device 150.

In FIG. 3, when the finder 120 of the mobile device 150 performs a certain activation event 210 (perhaps specified on first screen 200), the mobile device 150 changes to second screen 220. In this example of FIG. 3, the activation event 210 allows the application to call a specified call number that corresponds to the identifier "Home" e.g., call number of the residence of the owner. However, embodiments are not limited to this specific example, and the specified call number can be set to include a third party, a company, a relative of the owner, etc. As can be seen in the second screen 220 of the mobile device 150, the second screen 220 is similar to a regular phone call screen on the mobile device 150; however, the second screen 220 can be a different screen for making a call to the specified call number or prompting of an activation event.

FIGS. 4-7 show exemplary flows for performing aspects of the present invention. The steps of FIGS. 4-7 may be implemented in the environment of FIG. 1, for example. As noted above, the flowcharts of FIGS. 4-7 illustrate the architecture, functionality, and operation of possible implementations of systems, methods, and computer program products according to various embodiments of the present invention. The flowchart and block diagrams in the Figures illustrate the architecture, functionality, and operations of possible implementations of systems, methods, and computer program products according to various embodiments of the present invention. In this regard, each block in the flowchart or block diagrams may represent a module, segment, or portion of code, which comprises one or more executable instructions for implementing the specified logical functions. It should also be noted that, in some alternative implementations, the functions noted in the block may occur out of the order noted in the figures. For example, two blocks show in succession may, in fact, be executed substantially concurrently, or the blocks may sometimes be executed in the reverse order, depending upon the functionality involved. It will also be noted that each block of the block diagrams and/or flowchart illustration, and combination of blocks in the block diagrams and/or flowchart illustration, can be implemented by special purpose hardware-based systems that perform the specified functions or acts, or combinations of special purpose hardware and computer instructions.

Figure 4:
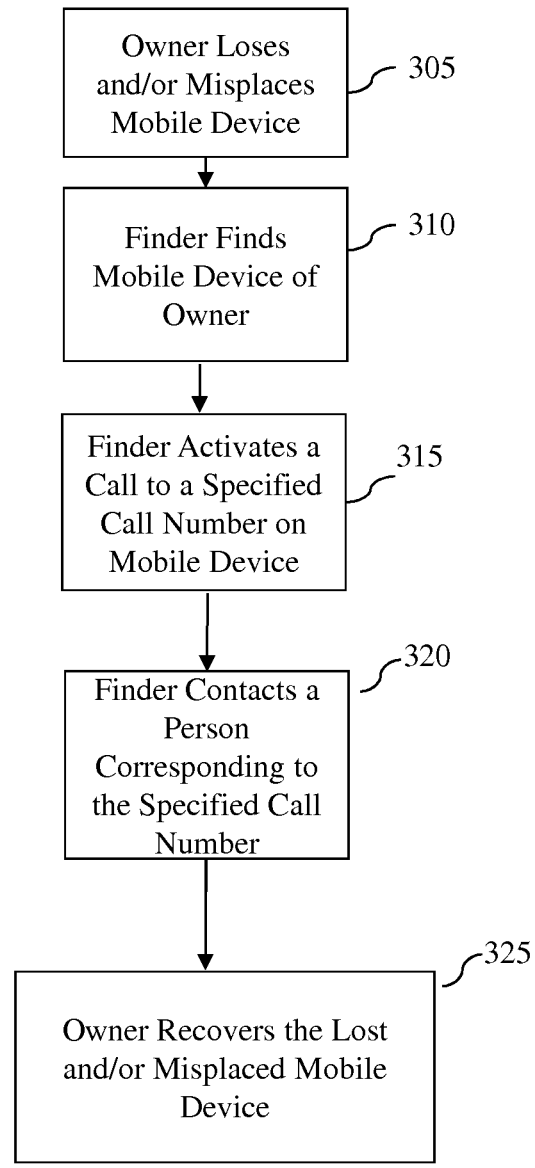
FIG. 4 shows a flow for activating a specified call number in accordance with aspects of the invention.

FIG. 4 depicts a flow for activating a specified call number in accordance with aspects of the invention. In FIG. 4, at step 305, the owner may misplace and/or lose mobile device. At step 310, a person (finder) finds mobile device. At step 315, finder performs an activation event which activates or initiates a call to a specified call number through the application on mobile device. Activating the specified call number through the application tool can be accomplished in several ways, such as at least one of a special key, a combination of keys, a special gesture input through a touch screen of the mobile device, a special sound input to a microphone of the mobile device, a visual activation, or a motion of the mobile device, any of which may be provided to the finder by the mobile device, itself. Further, the specified call number may be set to the owner of mobile device, a third party, a company, a relative of the owner, etc., through the application.

At step 320, after the call to the specified call number through the application is activated or initiated, finder can then contact a person corresponding to the specified call number. At step 320, contacting the person corresponding to the specified call number can comprise directly speaking to the person through mobile device or leaving a voicemail message or other type of message, e.g., text message. At step 325, after finder contacts the person corresponding to the specified call number, the owner retrieves the lost and/or misplaced mobile device from finder.

Figure 5:
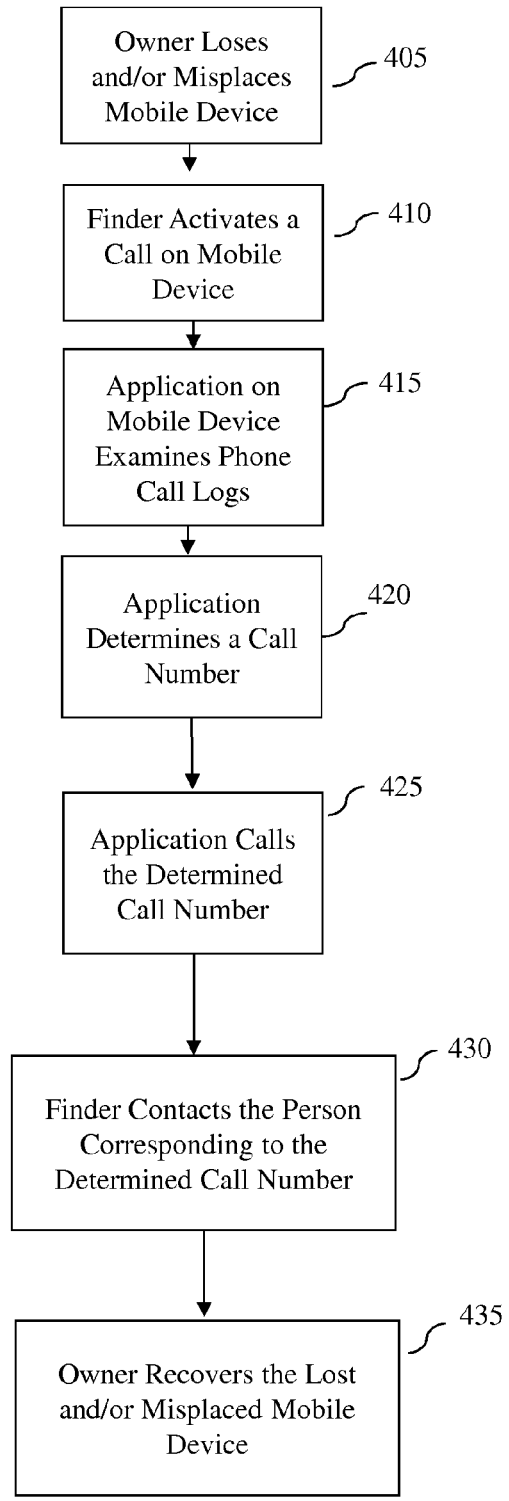
FIG. 5 shows a flow for activating a determined call number in accordance with aspects of the invention.

FIG. 5 is a flow for activating a determined call number in accordance with aspects of the invention. In other words, FIG. 5 is a situation where the call number is not specified in advance, but determined by the application tool 50 after finder performs an activation event to activate or initiate a call. At step 405, the owner misplaces and/or loses mobile device. At step 410, finder finds mobile device and activates or initiates a call (via an activation event) to a determined number through the application on mobile device. As described herein, activating the determined call number through the application tool can be accomplished in several ways, such as at least one of a special key, a combination of keys, a special gesture input through a touch screen of the mobile device, a special sound input to a microphone of the mobile device, a visual activation, or a motion of the mobile device, as noted above.

At step 415, the application may analyze phone call usage on mobile device to determine a call number. For example, in step 420, the application examines the phone call logs, and determines that a phone call is directed to a particular person more frequently (such as a parent of the mobile device the owner). This frequently called number is then set as the determined call number. Alternatively, in step 420, the application can examine the phone call log and set a number designated as "home" or other location or person as the determined call number.

At step 425, the application calls the determined call number. At step 430, after the call to the determined call number through the application is activated or initiated, finder then contacts a person corresponding to the determined call number. At step 435, after finder contacts the person corresponding to the determined call number, the owner retrieves the lost and/or misplaced mobile device from finder.

Figure 6:
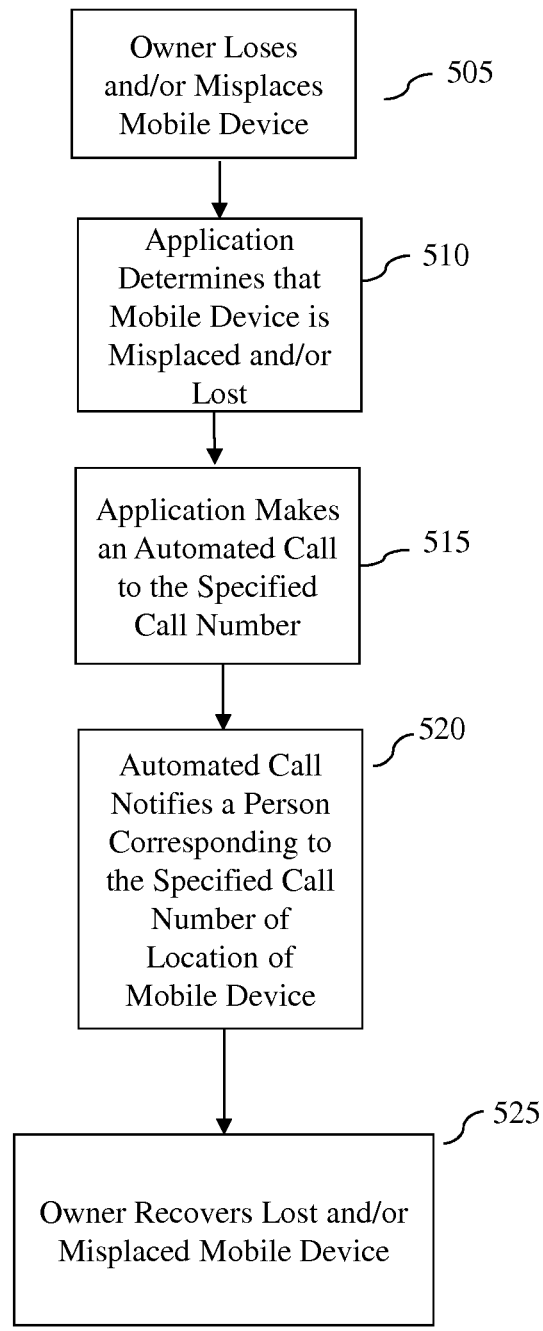
FIG. 6 shows a flow for activating an automated call in accordance with aspects of the invention.

FIG. 6 shows a flow for activating an automated call in accordance with aspects of the invention. In other words, FIG. 6 is a situation where the application of mobile device automatically makes a call to a specified call number based on the application determining that mobile device is misplaced and/or lost. At step 505, the owner misplaces and/or loses mobile device. At step 510, the application determines that mobile device is misplaced and/or lost. For example, the application may use location services (e.g., a global positioning system) of mobile device to determine that mobile device is in a location that is far away (i.e., a predetermined distance) from locations where the owner generally uses mobile device. Therefore, if mobile device is in a far away location, the application determines that mobile device is misplaced and/or lost. Alternatively, instead of using global position system, the application of mobile device may determine that the mobile device has not been used in a certain timeframe (i.e., a predetermined time), in which case the application determines that mobile device is misplaced and/or lost.

At step 515, if the application determines that mobile device is misplaced and/or lost, an automated call may be made by the application to the specified call number. The specified call number may be set to the owner of mobile device, a third party, a company, a relative of the owner, etc., through the application. At step 520, the automated call notifies a person corresponding to the specified call number of a location of mobile device. For example, the automated call may leave a voicemail, automated message, or text message, etc., which includes the coordinates of mobile device. Lastly, at step 525, the owner retrieves the lost and/or misplaced mobile device based on the automated call to the specified call number.

Figure 7:
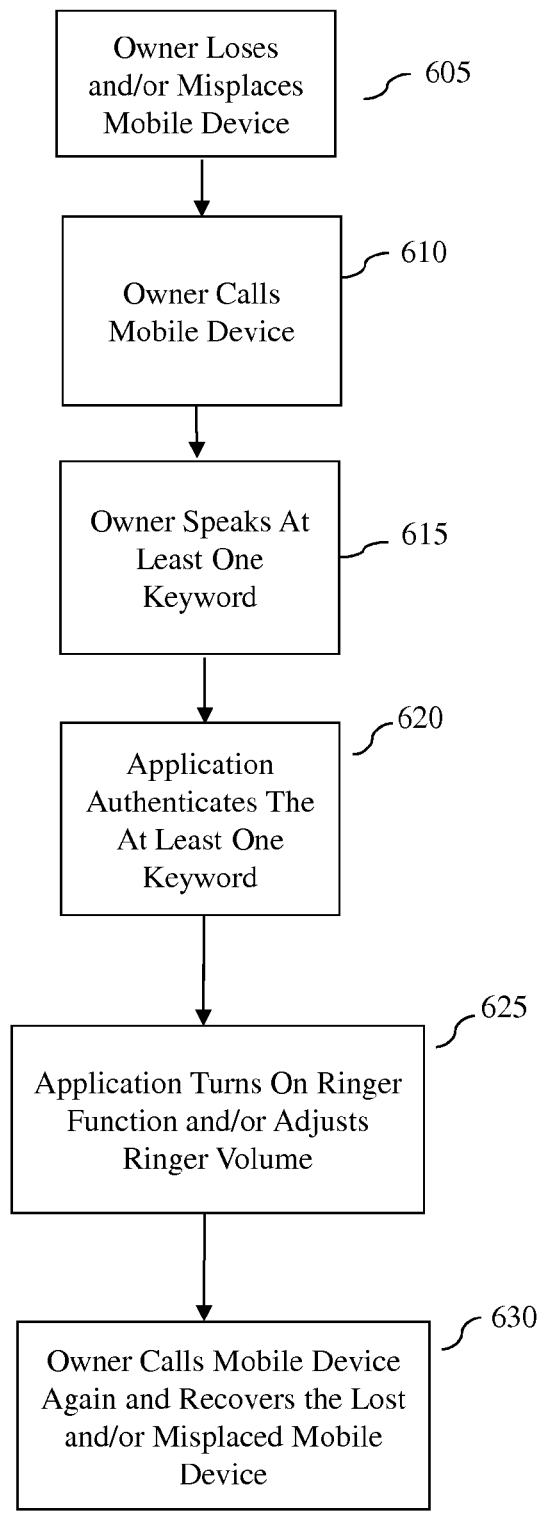
FIG. 7 shows a flow for a ringer function in accordance with aspects of the invention.

FIG. 7 shows flow for a ringer function in accordance with aspects of the invention. In other words, FIG. 7 is a situation where application of mobile device turns on the ringer function of mobile device when the owner misplaces and/or loses mobile device. In FIG. 7, at step 605, the owner may misplace and/or lose mobile device in an area near a location of the owner or otherwise. At step 610, the owner may call mobile device from another phone. At step 615, the application of mobile device may prompt the owner to speak or type at least one keyword, at which time the owner speaks (or texts, etc.) the at least one keyword. At 620, the application may authenticate the at least one keyword, which may include verifying the at least one keyword matches at least one predetermined keyword. Further, authenticating the at least one keyword may include performing a voice identification to verify that a speaker of the at least one keyword matches a predetermined voice of the owner.

In embodiments, multiple words may be spoken (or texted, etc.) to indicate ring volume. For example, if a person uses three code words, the first code word could be used to turn on the ringer and the second and third code words could be used to increase the ring volume bar two times. However, embodiments are not limited, and various combinations can be used to turn on the ringer and increase or decrease the ring volume. In one embodiment, the first code word could be used to turn on the ringer, the second code word can be used to ring at a low ring volume, and the third code word can be used to ring at a volume higher than the low ring volume after the low ring volume.

At step 625, after the at least one keyword is authenticated, application turns on the ringer function of mobile device. At step 630, the owner can call mobile device again and retrieve the misplaced and/or lost mobile device based on hearing mobile device ringing.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still another embodiment, the invention provides a computer-implemented method for activating a call number or other communication mechanism of a lost device, on a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method implemented in a computer infrastructure having program code stored on a computer readable hardware storage device, the program comprising:

program code to receive an activation event predefined for a specified password protected mobile device;

program code to search a log of the mobile device to determine a predefined contact information which is frequently contacted;

program code to receive the predefined contact information stored in the mobile device while the mobile device remains password protected, upon the receipt of the activation event;

program code to receive a first keyword and a second keyword from another device;

program code to authenticate the first received keyword and the second received keyword by verifying that the first received keyword and the second received keyword matches a first predetermined keyword and a second predetermined keyword, respectively;

program code to turn on a ringer function of the mobile device from a silent mode in response to authentication of the first received keyword; and program code to increase a ring volume of the ringer function of the mobile device in response to authentication of the second received keyword.

2. The method of claim 1, wherein the password protected mobile device denies access to contact functions of the mobile device, without entry of the activation event.

3. The method of claim 1, wherein the activation event is at least one of a designated key or combination of keys input through a touch screen or physical keys of the mobile device, a gesture input through a touch screen, a designated sound input, a visual activation, or a motion of the mobile device.

4. The method of claim 3, wherein the designated sound input is a person speaking a set of predefined words.

5. The method of claim 3, wherein the motion of the mobile device comprises a shaking of the mobile device in one of a horizontal or vertical direction for a predetermined period of time.

6. The method of claim 1, wherein the activation event is set by an owner of the mobile device.

7. The method of claim 1, wherein the activation event is set by one of a phone manufacturer, a mobile device service provider, an application developer, and an operating system programmer.

8. The method of claim 1, wherein the activation event is remotely activated or remotely deactivated by an owner of the mobile device.

9. The method of claim 1, wherein the predefined contact information is customized by the owner of the mobile device.

10. The method of claim 1, further comprising contacting a predefined call number which is stored on the mobile device utilizing the predefined contact information.

11. The method of claim 1, further comprising searching the log of the mobile device to determine the predefined contact information which is set as a certain defined contact.

12. The method of claim 1, wherein a service provider at least one of creates, maintains, deploys and supports the computer infrastructure.

13. The method of claim 1, wherein steps of claim 1 are provided by a service provider on a subscription, advertising, and/or fee basis.

14. A computer program product comprising a computer readable storage medium having program instructions embodied therewith, wherein the computer readable storage medium is not a transitory signal, and the program instructions are readable by a computing device to cause the computing device to perform a method comprising:
receiving an activation event for a mobile device which is password protected;
analyzing logs of contact information stored in the mobile device;
determining contact information from the analyzed logs;
contacting a device utilizing the determined contact information in response to the activation event, while the mobile device remains password protected;
receiving a first keyword and a second keyword from another device;
authenticating the first received keyword and the second received keyword by verifying that the first received keyword and the second received keyword matches a first predetermined keyword and a second predetermined keyword, respectively;
turning on a ringer function of the mobile device from a silent mode in response to authentication of the first received keyword; and
increasing a ring volume of the ringer function of the mobile device in response to authentication of the second received keyword,
wherein the determined contact information is a call number that is frequently called on the mobile device.

15. The computer program product of claim 14, wherein the determined contact information is the call number that is associated with a predetermined designation within the mobile device.

16. A system comprising:
one or more computer processors;
a computer readable hardware storage device;
program instructions stored on the computer readable hardware storage device for execution by the one or more computer processors, the program instructions comprising:
program instructions to determine a current location of the mobile device;
program instructions to compare a time period in which the mobile device has not been used within a predetermined time;
program instructions residing on a mobile device to determine that the mobile device is misplaced, wherein the determining that the mobile device is misplaced occurs when the time period in which the mobile device has not been used is greater than the predetermined time;
program instructions to automatically contact a device using predefined contact information stored in the mobile device in response to the mobile device being misplaced;
program instructions to receive a first keyword and a second keyword from another device;
program instructions to authenticate the first received keyword and the second received keyword by verifying that the first received keyword and the second received matches a first predetermined keyword and a second predetermined keyword, respectively;
program instructions to turn on a ringer function of the mobile device from a silent mode in response to authentication of the first received keyword; and
program instructions to increase a ring volume of the ringer function of the mobile device in response to authentication of the second received keyword.

17. The system of claim 16, wherein determining that the mobile device is misplaced also requires the current location of the mobile device to be greater than a predetermined distance from a predetermined location.

18. The method of claim 1, further comprising program code to prompt a finder of the mobile device to perform the activation event.

19. The method of claim 4, where the person speaking the set of predefined words is authenticated through voice identification before the activation event is received.

20. The method of claim 10, wherein the predefined call number is contacted using an SMS message.

* * * * *